United States Patent [19]

Weldes

[11] 3,709,837
[45] Jan. 9, 1973

[54] SPRAY DRIED DETERGENTS CONTAINING SODIUM-POTASSIUM DOUBLE SILICATE

[75] Inventor: Helmut H. Weldes, Havertown, Pa.
[73] Assignee: Philadelphia Quartz Company, Philadelphia, Pa.
[22] Filed: Dec. 30, 1970
[21] Appl. No.: 103,002

[52] U.S. Cl. .................. 252/527, 159/48 R, 252/135, 252/539
[51] Int. Cl. ......... C11d 3/08, C11d 7/14, C11d 11/02
[58] Field of Search ............... 252/135, 539, 531, 527

[56] References Cited

UNITED STATES PATENTS

| | | | |
|---|---|---|---|
| 3,639,287 | 2/1972 | Gabler et al. | 252/135 |
| 3,247,123 | 4/1966 | Schrager et al. | 252/135 |
| 3,247,122 | 4/1966 | Schaafsma et al. | 252/135 |
| 2,110,363 | 3/1938 | Howells et al. | 252/135 |

*Primary Examiner*—Leon D. Rosdol
*Assistant Examiner*—Dennis L. Albrecht
*Attorney*—Fred C. Philpitt

[57] ABSTRACT

A method has been found for increasing the silicate content in spray dried detergents without decreasing the spray dryer throughput. The method involves the preparation of detergent slurries with high solids content by adding alkali metal silicates to the slurries in the form of sodium-potassium double silicate glass. Thus, the amount of water that must be removed in the drying tower is reduced and/or the silicate content can be increased when compared with slurries prepared with sodium silicate solutions.

6 Claims, No Drawings

SPRAY DRIED DETERGENTS CONTAINING SODIUM-POTASSIUM DOUBLE SILICATE

INTRODUCTION

Spray dried detergents are prepared by combining the detergent ingredients in a slurry at about 60 percent solids in a crutcher followed by spray drying this slurry to obtain a granular, free-flowing product of about 10 percent water content. Generally, sodium silicates, which are included in detergents for their detergent building and corrosion inhibiting properties, are added to the crutcher mix as solutions containing 40 to 60 percent water. Most of this water must be removed in the drying tower to give a free-flowing, granular product. The production or throughput of a spray drying tower depends upon the amount of water that must be removed from the slurry to give the apparently dry product. Therefore, if the water added with the silicate can be reduced and the solids content of the slurry increased, then the production of the detergent spray tower will be increased and/or the silicate content of the final detergent can be increased without decreasing the spray tower throughput.

I have found that detergent crutcher slurries of high solids and high soluble silicate content which yield satisfactory spray dried products can be prepared by using a powdered sodium-potassium double silicate glass as the source of alkali metal silicate. It has been thought that alkali metal silicate glasses dissolve too slowly for use in detergents especially spray dried products. Surprisingly, it has been found that sodium/potassium double silicates contribute greatly to the solubility of the final detergent mixture and contribute excellent builder and corrosion resistant properties.

THE INVENTION

The sodium-potassium double silicate glasses can be made by any method, including fusion of sand with potassium and sodium salts or by hydration of a sodium silicate glass with a solution containing potassium alkali. The mixed silicate glass can have a ratio of $Na_2O/K_2O$ on a mole basis between 15.0 and 0.1 and the ratio of $siO_2/Na_2O + K_2O$ on a mole basis can be between 1.6 and 4. The moisture content of the glass can be up to 20 percent and the particle size is such that all of the material passes through a 100 mesh screen. The bulk density of the powdered glass is between 45 and 85 lbs/cu.ft.

The detergent slurry is prepared by blending 10 to 50 percent of the anionic surfactant, such as tridecyl benzene sodium sulfonate; 5 to 50 percent of sequestering agent, such as sodium tripolyphosphate (STPP) and/or organic sequestering agents, such as nitrilotriacetic acid or its sodium salt (SNTA); 0 to 5 percent of anti-redeposition agent, such as carboxymethyl cellulose (CMC); 0 to 2 percent of optical brightener, and 5 to 30 percent sodium-potassium silicate builder and corrosion inhibitor. Other ingredients, such as soda ash, sodium sulfate, borax and such ingredients generally classified as bulking agents can also be included. This slurry must then be pumped into the mixed flow spray tower and dried with warm air to give a free-flowing granular product containing 3 to 15 percent water.

I have found that detergent slurries of high silicate solids content can be prepared by using the mixed sodium-potassium silicate glass. These slurries can be pumped and spray dried at this higher silicate content. Because a slurry of increased solids content can be spray dried the throughput of the spray drying tower and the silicate content of the final detergent can be increased. These advantages are particularly evident when larger amounts of the sodium-potassium silicate glass (15 to 30 percent) are included.

The detergents prepared in this manner dissolved completely in the washing solution and were efficient laundry compounds.

A further understanding of the invention will be obtained from the following illustrative examples which should not be considered restrictive.

EXAMPLE 1

A slurry of the following composition was made in a crutcher using 1.6 $SiO_2/Na_2O$ mole ratio sodium silicate solution of 50 percent solids concentration, and heated about 75° C for 10 minutes.

| | |
|---|---|
| Linear tridecyl benzene sulfonate | 18.0 pbw |
| Sodium Sulfate, anhydrous | 14.0 |
| Sodium tripolyphosphate, anhydrous | 50.0 |
| Sodium Silicate Solution (1.6 $SiO_2/Na_2O$; 50% solids) | 12.0 |
| CMC | 1.0 |
| FWA (Blancophor RG, GAF Corp) | 0.3 |
| Water | 32.0 |

This slurry was pumped through a spray tower with full counter-current air throughput and jet-type spray; inlet temperature was 320° C, outlet temperature 93° C. The production rate was 50,000 lbs/hour of a free-flowing product with a moisture content of 10.7 percent, a bulk density of 0.35g/cm³. The product was an excellent laundry compound, readily soluble in the household washing machine.

EXAMPLE 2

The same detergent slurry as in example 1 was prepared using 6 pbw crushed sodium silicate glass of 1.6 mole $SiO_2/Na_2O$ ratio with a sizing of all −200 mesh and 80 percent −325 mesh (Tyler), and 6 pbw additional water to compensate for that normally introduced when using silicate solutions. This slurry was heated for 10 minutes at 90° C and then spray dried under the conditions of example 1. A free-flowing product with a moisture content of 10.9 percent and a bulk density of 0.3g/cm³ was obtained at a rate of 48,000 lbs/hour; this material performed very well as a laundry compound dissolving readily in the washing machine.

EXAMPLE 3

The same detergent slurry as in example 1 was prepared using 6 pbw of a crushed mixed sodium/potassium silicate glass with a mole ratio of 1.99 $SiO_2/M_2O$, $Na_2O/K_2O$ 12.0; sizing all − 150 mesh, 71 percent −325 mesh. No extra water was added. The slurry was heated for 10 minutes at 80° C and then spray dried under the conditions of example 1. A free-flowing product with a moisture content of 10.8% and a bulk density of 0.33g/cm³ was produced at a rate of 60,000 lbs. per hour, equivalent to a throughput increase over examples 1 and 2 of about 20 percent. It gave excellent performance as a laundry detergent.

EXAMPLE 4

A slurry composition was prepared in the crutcher containing decreased amounts of sodium tripolyphosphate, some SNTA and an increased amount of 1.6 mole ratio sodium silicate solution (9 percent silicate solids in mix instead of 6 percent as in examples 1 to 3).

| | |
|---|---|
| Linear Tridecyl benzene sulfonate | 18.0 pbw |
| Sodium Sulfate, anhydrous | 13.0 |
| Sodium Tripolyphosphate, anhydrous | 38.0 |
| Sodium Nitrilotriacetic Acid, monohydrate | 10.0 |
| Sodium Silicate Solution (1.6 $SiO_2/Na_2O$; 50% solids) | 18.0 |
| CMC | 1.0 |
| FWA (Blancophor RG, GAF Corp) | 0.3 |
| Water | 32.0 |

Crutcher heating cycle and spray drying conditions were the same as in previous examples. A free-flowing product of 10.7 percent moisture content and 0.3g/cm³ bulk density was obtained at a production rate of only 43,000 lbs/hr because of the increased amount of water carried into the crutcher mix through the silicate solution and the SNTA·$H_2O$. Laundry performance was comparable to standard household detergents.

EXAMPLE 5

The same crutcher composition was prepared as in example 4 using 9 pbw of a crushed mixed sodium/potassium silicate glass with a mole ratio of 1.97 $SiO_2/M_b^{0.}$ $Na_2O/K_2O$ 6.0, sizing all −150 mesh, 80 percent −270 mesh. No extra water was added to compensate for that introduced when using silicate solutions. The crusher mix was heated to 90° C for 10 minutes and then spray dried as in previous examples. A free-flowing product of 11 percent moisture content and 0.32g/cm³ bulk density was produced at a rate of 56,000 lbs/hour. Solubility and performance as a household laundry detergent was excellent.

EXAMPLE 6

A low phosphate content crutcher mix was prepared with greatly increased silicate content by incorporating finely crushed sodium/potassium silicate glass with a mole ratio of 2.01 $SiO_2/M_2O$, $Na_2O/K_2O$ 3.0, sizing all −150 mesh, 87.0 percent −200 mesh.

| | |
|---|---|
| Linear Tridecyl Benzene Sulfonate | 20.0 pbw |
| Sodium Sulfate, anhydrous | 20.0 |
| Sodium Tripolyphosphate, anhydrous | 16.0 |
| Sodium Nitrilotriacetic acid, monohydrate | 16.0 |
| Mixed silicate glass powder (2.01 mole ratio) | 16.0 |
| CMC | 1.0 |
| FWA (Blancophor RG, GAF Corp) | 0.3 |
| Water | 40.0 |

The mix was heated for 10 minutes at 90° C and then spray dried under the same conditions as in previous examples. A free-flowing, readily soluble, non-caking product was obtained with a bulk density of 0.33g/cm³ and a moisture content of 10.5 percent. Production rate was 60,000 lbs/hour. The product gave washing performance equivalent to standard laundry products.

EXAMPLE 7

A phosphate-free household laundry detergent was produced. A crutcher mix of the composition given below was prepared containing 27 pbw of a crushed mixed sodium/potassium silicate glass with a mole ratio of 2.01 $SiO_2/M_2O$, $Na_2O/K_2O$ 0.9.

| | |
|---|---|
| Linear Tridecyl Benzene Sulfonate | 20.0 pbw |
| Sodium Sulfate, anhydrous | 14.0 |
| Sodium Nitrilotriacetic acid, monohydrate | 27.0 |
| Mixed Silicate Glass Powder (2.01 mole ratio) | 27.0 |
| CMC | 1.0 |
| FWA (Blancophor RG, GAF Corp) | 0.3 |
| Water | 34.0 |

The slurry was heated in the crutcher and spray dried as in example 6. The free-flowing, granular, non-caking product had a bulk density of 0.3 g/cm³ and a moisture content of 11 percent. Production rate was 60,000 lbs/hour. It dissolved completely in the washing machine and gave excellent detergency.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. The method of making a spray dried detergent which comprises
   a. forming a detergent slurry of about 60–70 percent solids content by blending water with a mixture comprising
      1. 10–50% of an anionic surfactant,
      2. 5–50% of a sequestering agent,
      3. 0–5% of an anti-redeposition agent,
      4. 0–2% of an optical brightener, and
      5. 5–30% of a sodium-potassium silicate glass powder in which the ratio of $Na_2O/K_2O$ on a mole basis is between 15.0 and 0.1, the ratio of $SiO_2/Na_2O + K_2O$ on a mole basis is between 1.6 and 4, the particle size is such that all the powder passes through a 100 mesh screen, and the bulk density is between 45 and 85 lbs/cu. ft., and thereafter
   b. spray drying the detergent slurry of (a) under drying conditions that will give a free-flowing, granular product containing 3 to 15 percent water.

2. The method of claim 1 wherein the detergent slurry contains 15–30 percent sodium-potassium silicate glass.

3. The method according to claim 1 wherein said anionic surfactant is tridecyl benzene sodium sulfonate.

4. A method according to claim 1 wherein said sequestering agent is selected from the group consisting of nitrilotriacetic acid, the sodium salt of nitrilotriacetic acid and sodium tripolyphosphate.

5. A method according to claim 1 wherein said anti-redeposition agent is carboxymethyl cellulose.

6. The method according to claim 1 wherein said anionic surfactant is tridecyl benzene sodium sulfonate, said sequestering agent is selected from the group consisting of nitrilotriacetic acid, the sodium salt of nitrilotriacetic acid and sodium tripolyphosphate, and said anti-redeposition agent is carboxymethyl cellulose.

* * * * *